(12) United States Patent
Hardwick (10) Patent No.: US 7,288,310 B2
(45) Date of Patent: Oct. 30, 2007

(54) FLOORING TILE AND MANUFACTURING PROCESS

(75) Inventor: James N. Hardwick, Sheffield, AL (US)

(73) Assignee: Domco Tarkett, Inc., Farnham, Quebec (CA)

( * ) Notice: Subject to any disclaimer, the term of this patent is extended or adjusted under 35 U.S.C. 154(b) by 608 days.

(21) Appl. No.: 10/349,639

(22) Filed: Jan. 23, 2003

(65) Prior Publication Data

US 2004/0146695 A1 Jul. 29, 2004

(51) Int. Cl.
*B32B 3/28* (2006.01)

(52) U.S. Cl. .................. 428/181; 428/60; 428/192; 428/88; 428/81; 428/130; 52/311.1; 52/311.2

(58) Field of Classification Search .......... 428/60, 428/192, 88, 81, 130, 181; 52/311.1, 311.2
See application file for complete search history.

(56) References Cited

U.S. PATENT DOCUMENTS 4,212,899 A * 7/1980 Hodakowski et al. ....... 427/500
4,678,528 A * 7/1987 Smith et al. ................. 156/220
5,362,560 A * 11/1994 Ehrhart et al. .............. 428/343

* cited by examiner

Primary Examiner—Patrick Joseph Ryan
Assistant Examiner—Jane Rhee
(74) Attorney, Agent, or Firm—Norris, McLaughlin & Marcus (57) ABSTRACT

The present invention relates generally to a process for manufacturing resilient floor and wall tiles and the products obtained thereby. More particularly, the invention relates to resilient tiles which have been individually cut, routed and mechanically embossed on two adjacent edges to give the appearance that each individual tile has grout lines on two adjacent edges. When a series of these tiles are installed on a floor or wall, the seams between the individual tiles are less visible than when using resilient tiles of the prior art having grout lines on all edges of the tile. This is because the seams between the tiles of the present invention are not in the grout lines themselves but rather adjacent to the grout lines. This creates a more realistic appearance.

15 Claims, 10 Drawing Sheets

FLOORING TILE AND MANUFACTURING PROCESS

BACKGROUND OF THE INVENTION

The present invention relates generally to a process for manufacturing surface coverings, such as floor and wall tiles, and the products obtained thereby. In one embodiment, the invention relates to rectangular vinyl tiles which have been individually cut, and then routed and mechanically embossed on two adjacent edges to give the appearance, when installed, that each individual tile has grout lines on all of the edges.

Resilient tiles have previously been manufactured which give the appearance of grout lines being provided on all of the edges of the tile. The disadvantage of such prior art resilient tiles, however, is that when a series of these tiles are installed next to each other such as in a flooring application, the seams which result between the edges of the adjacent floor tiles lie in the middle of the grout lines created between each tile. Such seams are readily visible and detract from the effort to provide the realistic appearance of, for example, a ceramic tile floor with actual cementitious grout between the tiles.

In contrast, when a series of tiles of the present invention are installed on a floor or wall, the seams between the individual tiles are less visible than when using resilient tiles of the prior art having grout lines on all of the edges of the tile. This is because the seams between the tiles of the present invention are not in the grout lines themselves but rather adjacent to the grout lines. This creates a more realistic appearance.

BRIEF SUMMARY OF THE INVENTION

In accordance with the present invention, a novel process is provided for producing a novel resilient floor and wall tile which is designed to overcome these problems. As used herein, the terms "routing" or "skimming" mean removing a portion of the tile, such as by cutting, to create both a horizontal surface and a vertical surface along an edge of the tile, or, alternatively, to create both a horizontal surface and an angled surface along an edge of the tile. The term "nipping" means removing a portion of the tile, such as by cutting, to create an angled surface along an edge of the tile.

Briefly stated, the present invention begins with the production of a resilient tile which is comprised of a substrate, a printed film layer laminated on top of the substrate, and an optional coating layer such as urethane applied on top of the printed film layer. In one embodiment, instead of a printed film layer, an inlaid layer can be provided on the substrate. The substrate may be a composite, e.g., it may include a foam layer on its backside. The inlaid layer may optionally include particles such as colored chips, flakes and/or spheres. Again, an optional coating layer such as urethane can be applied on top of the inlaid layer. In a preferred embodiment, the resilient tile is a vinyl tile.

When rectangular tiles are used, the tiles are initially oversize cut by about ½ inch greater than final nominal tile sizes. The usual final nominal tile sizes are 12 inch, 16 inch and 18 inch squares. Thereafter, the tiles are heated in an oven to a temperature from about 150° F. to about 250° F., preferably from about 180° F. to about 220° F., and then cooled to approximately the ambient temperature in the factory. This heating and cooling step relieves stresses in the tile which might otherwise result in poor sizing and dimensional instability of the finished tile, shrinking of the tile after installation, and chipping or cracking of the tile during the processing steps which follow.

Figure 3:
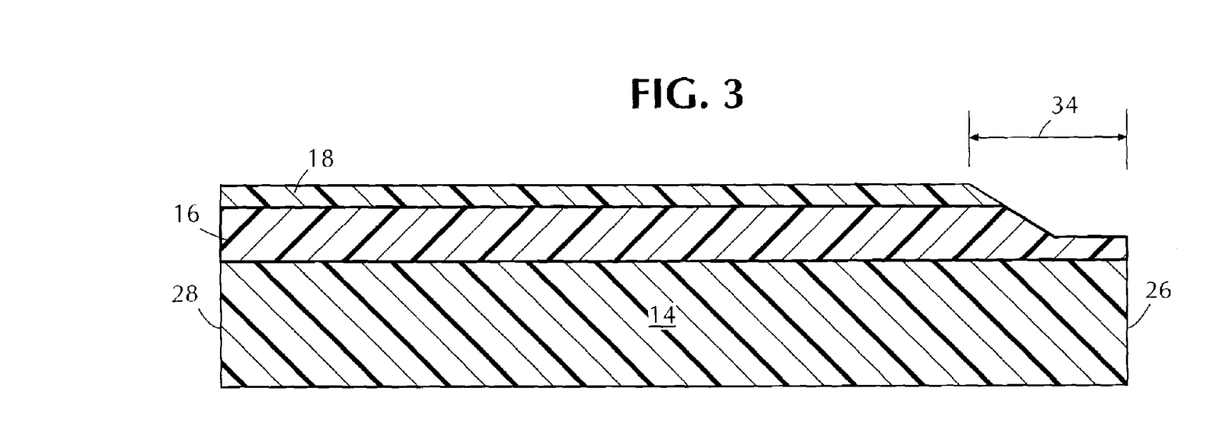
FIG. 3 is a cross-section schematic view of the tile of the present invention after an edge of the tile has been routed by a skimming saw.
Figure 5:
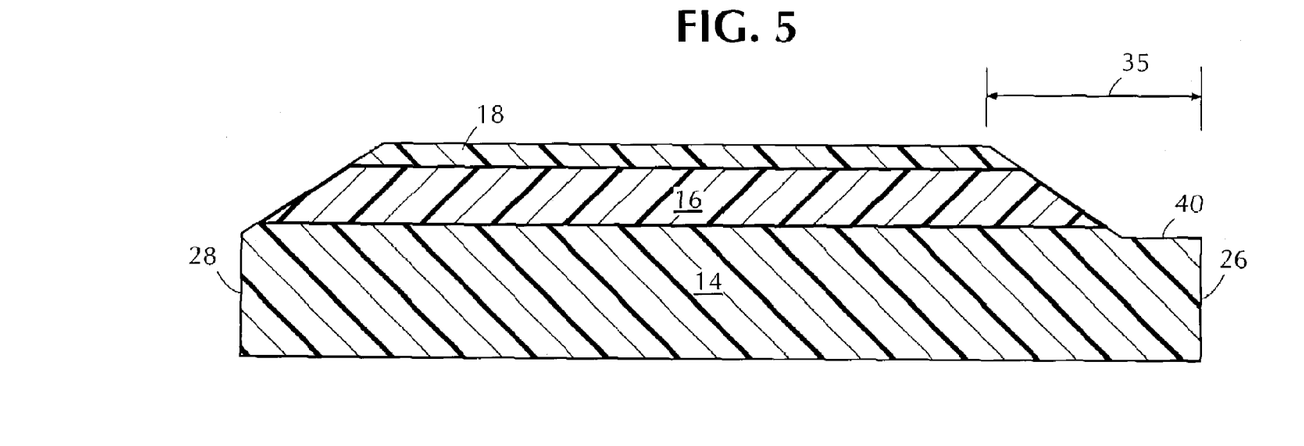
FIG. 5 is a cross-sectional schematic view of the tile of the present invention after deep routing by a skimming saw or after routing by a finishing saw.

The tile is then finish cut with a die cutter to a final dimension of nominal tile size. In one embodiment the finish cut resilient tiles are placed onto an "L"-shaped production line. As each tile moves along the first leg of the production line, one edge of the finish cut tile is subsequently routed by means of a skimming saw to pre-cut the edge of the tile. That is, the skimming saw removes along said one edge all of the top coating layer and a portion of the underlying printed film or inlaid layer thereby exposing the remainder of the underlying printed film layer or inlaid layer. During this cutting operation, the skimming saw optionally creates a slight beveled edge in the top coat layer and the printed film layer of about 30 degrees measured from the horizontal. (See FIG. 3). In another embodiment, the saw can rout more deeply by removing along said one edge all of the top coating layer, all of the underlying printed film or inlaid layer and a portion of the substrate along one edge of the tile. Again, the saw optionally creates a slight beveled edge which runs from the top surface of the tile to the top surface of the remaining portion of the substrate. (See FIG. 5). In this embodiment, the saw essentially functions as a finishing saw because further routing is unnecessary.

Figure 4:
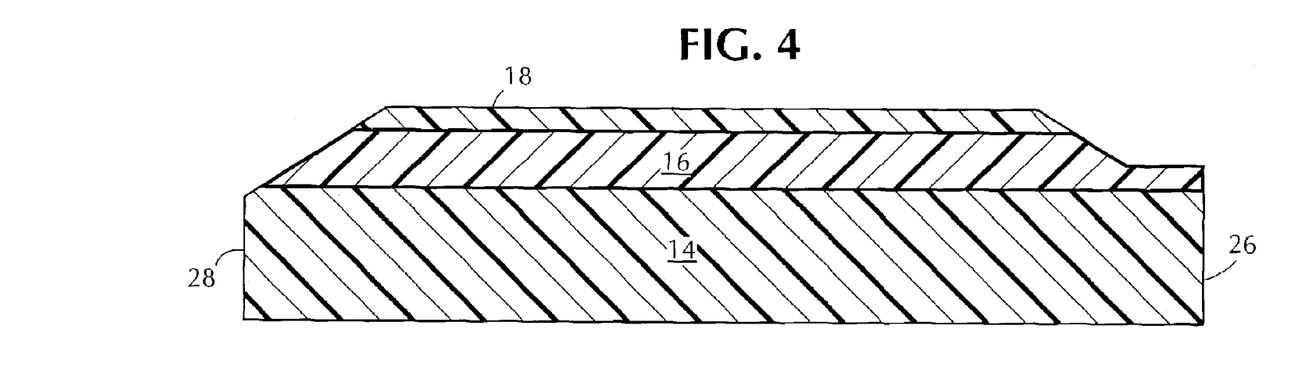
FIG. 4 is a cross-sectional schematic of the tile of the present invention after cutting of the opposing edge by a nipping saw.

The edge of the tile opposed to the routed edge is then optionally nipped with another saw to produce a beveled edge in the top coat layer, the printed film or inlaid layer, and the substrate of about 30 degrees measured from the horizontal. The angle of the beveled edge created by the skimming saw along one edge of the tile and the angle of the beveled edge created by the nipping saw on the opposing edge of the tile are about the same. (See FIG. 4). As will be readily apparent to one of ordinary skill in the art, a tool other than a saw, such as a router, can be utilized to perform any of the routing, skimming, finishing or nipping operations.

In a preferred embodiment, to prevent chipping, the more shallow pre-cut skimming is performed first and the tile then continues to move along the first leg of the production line to a finishing saw. There the edge of the tile which had previously been routed by the skimming saw is further cut or routed to remove more of the topcoat, printed film or inlaid layer, and a portion of the substrate. A smooth flat surface in the substrate is therefore exposed. (See FIG. 5). The nipping operation is optional and the sequence in which the tile is nipped relative to other production line operations is not critical to the invention. The nipping operation, however, is preferred if the skimming saw creates a beveled edge.

The tile is then further moved along the first leg of the production line to an embossing wheel. The embossing wheel is heated, for example, by hot air or hot oil. The exposed substrate along one edge of the tile is then mechanically embossed by the embossing wheel to impart to the exposed substrate the texture of the embossing wheel, preferably the texture and appearance of a cement grout. After embossing one edge of the tile to give it the appearance of grout, this embossed edge or grout line is sprayed with a decorative and/or a protective layer such as a urethane coating or a vinyl ink.

Thereafter, the resilient tile is moved onto the second leg of the production line which in one embodiment is oriented at a right angle to the first leg of the production line. The routing, nipping and embossing steps are then repeated to produce a resilient tile having two adjacent mechanically embossed grout lines which are at 90 degrees to each other and two adjacent nipped edges which are at 90 degrees to each other, the nipped edges being the edges that are not mechanically embossed. When these individual tiles are subsequently installed on a floor or wall, the seams between the tiles are less visible because the seams are not in the grout lines, such as with prior art resilient tiles, but rather the seams are adjacent to the grout lines. (See FIGS. 6 and 8). This creates a more aesthetically desirable appearance.

In accordance with the foregoing objects, a resilient tile and method of making the tile is disclosed providing improved tiles which provide a more aesthetically pleasing appearance when installed on a floor or wall.

The novel aspects of the invention are set forth with particularity in the appended claims. The invention itself, together with further objects, features, aspects and advantages will be readily apparent to those skilled in the art and a better understanding of the present invention may be had by reference to the following detailed description taken in connection with the following drawings.

DESCRIPTION OF THE PREFERRED EMBODIMENT

The following detailed description is directed to a solid vinyl tile having four edges. However, one of ordinary skill in the art will readily recognize that the following teachings may be applied to other resilient materials and tile constructions.

Figure 1:
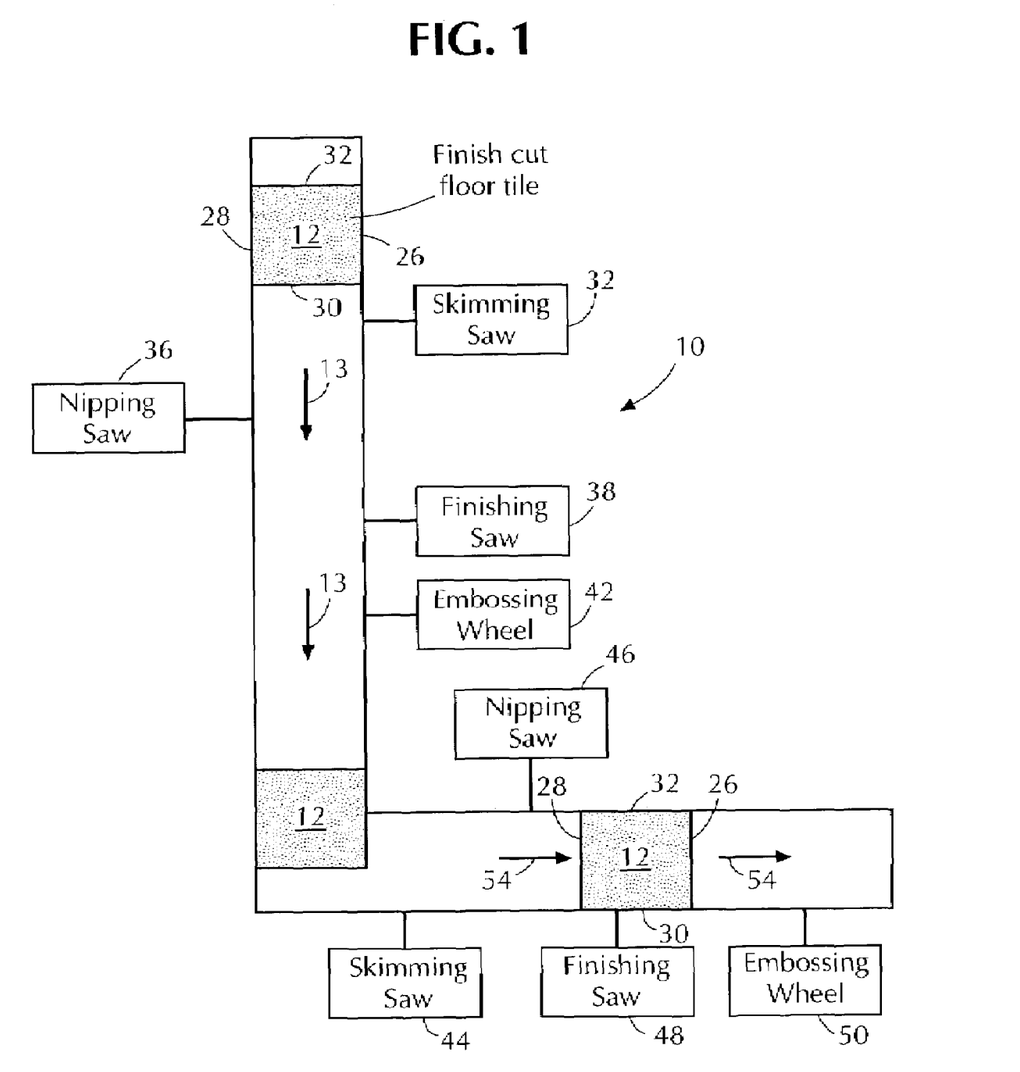
FIG. 1 is a schematic top plan view of one of the production lines on which the resilient tiles of the present invention are manufactured.

Referring now to the drawings, there is shown in FIG. 1 a production line 10 having an "L" shape configuration. A finish cut floor tile 12 is moved along the production line by a moving belt or other conveying means in the direction depicted by arrows 13. The finish cut floor tile 12 is preferably generally in the shape of a square having dimensions of about 12 inches by about 12 inches, or about 16 inches by about 16 inches, or about 18 inches by about 18 inches. It will be understood by those of ordinary skill in the art that the floor tile of the invention is not limited by these dimensions and larger and smaller squares, rectangles and other geometrically shaped tiles having an even number of sides can be made embodying the principles of the present invention. For example, on hexagonal-shaped tiles 12', the routing will be performed on three adjacent edges and the nipping will be performed on the other three edges (see FIG. 9) and on octagonal-shaped tiles 12" the routing will be performed on four adjacent edges and the nipping will be performed on the other four edges (See FIG. 10).

Figure 2:
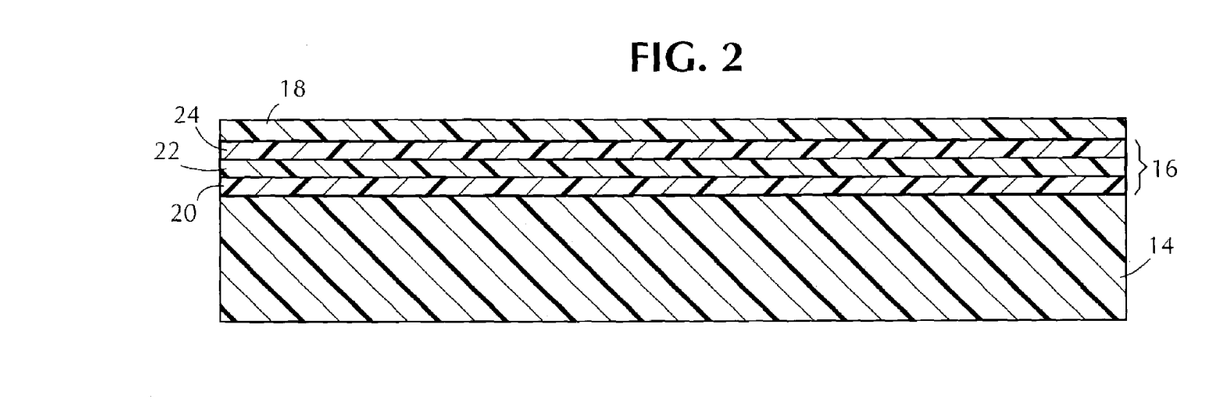
FIG. 2 is a cross-section schematic view of the tile of the present invention before it is routed, nipped or embossed.

The floor tile 12 is preferably comprised of a substrate 14, a printed film layer 16 laminated on top of the substrate, and a top coat layer 18 applied on top of the printed film layer. (See FIG. 2). The substrate 14 is a vinyl composite such as plasticized polyvinyl chloride (PVC) filled with color. The color selected is preferably that of grout such as is commonly used between floor tiles. The printed film layer 16 is itself comprised of three layers: a base color layer 20 on top of the substrate 14, a print layer 22 on top of the base color layer, and a clear PVC film layer 24 on top of the print layer 22. The base color layer 20 is a PVC plasticized film or a thick coated ink or a polymeric material. The printed film layer 16 may also be replaced by a homogeneous or heterogeneous inlaid layer. The top coat layer 18 provides abrasion resistance and is preferably urethane. The top coat layer 18 can be comprised of tinted or textured decorative coatings as well as performance enhancing coatings with particulates, e.g., ceramic shears.

If an inlaid layer is used in floor tile 12 instead of printed film layer 16, the inlaid layer is typically comprised of three-dimensional decorative particles of various sizes and geometric shapes, such as resinous or metallic chips, flakes and/or spheres, embedded in a layer of a resinous polymer composition, preferably a clear or translucent (tinted) PVC plastisol or organosol, to produce a resultant embedded matrix. This inlaid layer can be embossed with various textures to imitate the texture and appearance of, for example, slate or ceramic tile. The inlaid layer can vary in thickness from about 0.03 inches to about 0.24 inches. Those skilled in the art will appreciate that other commonly employed constituents can be present in the resinous polymer composition in minor proportions. Such other constituents commonly include heat and light stabilizers, viscosity depressants, and/or pigments and dyes.

Referring again to FIG. 1, the finish cut floor tile 12 is moved along production line 10 until one edge 26 of the floor tile contacts skimming saw 32. The skimming saw is a 10 inch outside diameter, 30 tooth carbide tipped blade. The blade is driven by a 5 HP, 3600 RPM motor. Skimming saw 32 routs or cuts through and removes top coat 18 in addition to a portion of printed film layer 16. The width 34 of the cut or furrow produced by skimming saw 32 is from about 0.20 inches to about 0.30 inches, preferably 0.25 inches. (See FIG. 3).

Referring again to FIG. 1, the finish cut floor tile 12 then continues to move along production line 10 until the edge 28 of the floor tile opposed to the edge 26 of the floor tile which contacted the skimming saw comes into contact with nipping saw 36. The nipping saw is a 10 inch outside diameter, 30 tooth carbide tipped blade with a 30 degree V-shaped tip.

Figure 13A:
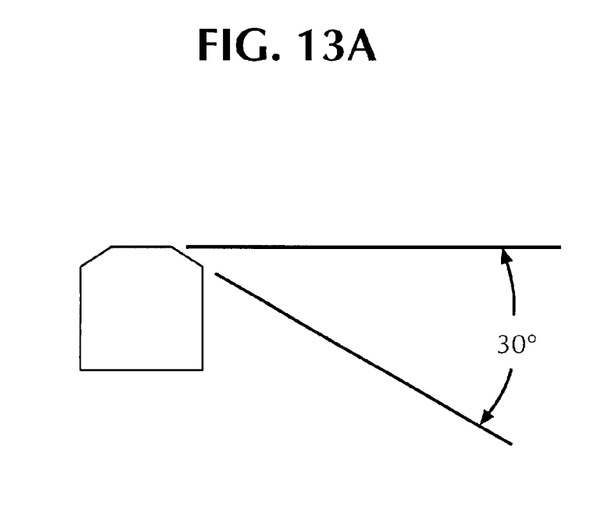
FIG. 13 is a plan view of the edges of the blades of the skimming saw and the nipping saw.
Figure 13B:
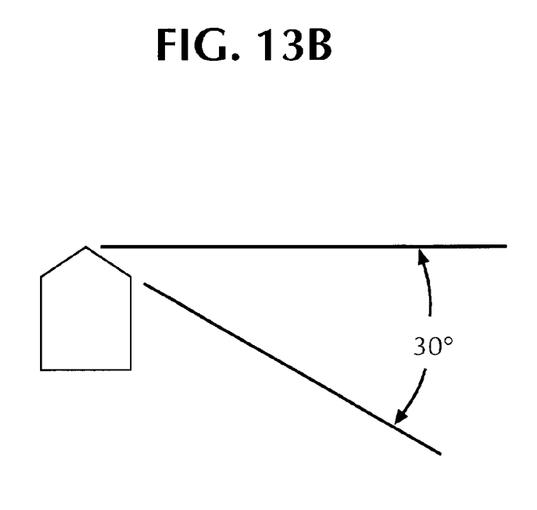

The blade is driven by a 5 HP, 3600 RPM motor. As the floor tile 12 moves beneath the nipping saw, nipping saw 36 proceeds to remove a portion of the top coat 18, printed film layer 16 and a slight portion of the substrate 14 of the vinyl floor tile along edge 28 so that edge 28 is beveled at an angle of about 30 degrees from the horizontal along the length of edge 28. (See FIGS. 4 and 13).

After edge 28 has been cut, or nipped, by the nipping saw, the floor tile 12 continues to move along production line 10 until edge 26 comes into contact with finishing saw 38. The finishing saw is of the same construction as the skimming saw 32. As edge 26 of floor tile 12 comes into contact with the finishing saw, the finishing saw removes over width 35 the remainder of printed film layer 16 and a portion of substrate 14, leaving a smooth flat surface 40 in the substrate 14. The finishing saw also creates the same nipped edge as described in the foregoing paragraph. (See FIG. 5).

After edge 26 has been cut or routed by the finishing saw 38, the smooth flat surface 40 in substrate 14 is next contacted by a textured surface of an embossing wheel 42. (See FIG. 1). For example, a hollow embossing wheel heated with either hot air or hot oil can be used. The embossing wheel has an outer diameter of about 8 inches, is constructed of metal, and is driven by a gear motor at a lineal speed equal to that of the tile. The textured surface of the embossing wheel is heated to close to the melting temperature of the substrate 14 to be displaced during the mechanical embossing step. Therefore, the embossing wheel is heated to a temperature in the range from about 250° F. to about 400° F., preferably from about 300° F. to about 400° F., and most preferably to a temperature of about 350° F. The temperature of the embossing wheel is maintained by means of a temperature sensor and controller. The embossing wheel 42 can be heated to this temperature either by blowing hot air inside of the wheel, by injecting hot oil inside of the wheel, or by electric cartridges. As the flat surface 40 of substrate 14 comes into contact with heated embossing wheel 42, the flat surface 40 softens and the texture of the embossing wheel is imparted onto surface 40 by displacing a portion of the substrate. The textured surface of the embossing wheel can be any texture but preferably the texture of the embossing wheel imitates the texture of cementitious grout. Pressure may optionally be applied to the embossing wheel 42 when it is in contact with surface 40 to vary the depth of the mechanical embossing in the substrate.

After the mechanical embossing step, the mechanically embossed portion (grout line) 52 of vinyl tile 12 is sprayed with a coating. The coating can be either urethane, a clear or tinted vinyl ink, or any other performance or colored coating. The coating is applied with an air spray gun.

After the mechanical embossing and coating steps, floor tile 12 is conveyed along the production line 10 until it reaches the confluence of the two legs of the "L" shaped production line. Thereafter, the floor tile is not rotated but rather is conveyed at a right angle to its original direction of travel along the first leg of the production line. That is, the tile is now conveyed in the direction of arrows 54. (See FIG. 1). In this manner, edge 30 of floor tile 12 is contacted by a second skimming saw 44 of the same construction and operation as skimming saw 32. Opposed edge 32 of floor tile 12 is subsequently contacted by a second nipping saw 46 of the same construction and operation as nipping saw 36. Edge 30 is then contacted by a second finishing saw 48 of the same construction and operation as finishing saw 38. The second finishing saw 48 removes the remainder of printed film layer 16 and a slight portion of substrate 14, over a second width, leaving a second smooth flat surface (not shown) in the substrate 14. The second smooth flat surface in substrate 14 is next contacted by a textured surface of a second hollow embossing wheel 50 of the same construction and operation as embossing wheel 42. After the second mechanical embossing step, the second embossed portion of the tile 12 is sprayed with a coating. Again the coating is applied with an air spray gun and can be either urethane or a clear or tinted vinyl ink. In this manner a vinyl floor tile having two adjacent grout sides at right angles to each other and two adjacent nip sides at right angles to each other is produced. It will be understood by one of ordinary skill in the art that if, for example, a hexagonal tile was to be produced, an "L"-shaped production line may not be suitable. Instead, for example, the tile could be passed through the first leg of the production line described herein on three occasions, repositioning it as necessary after each pass through the line.

Figure 6:
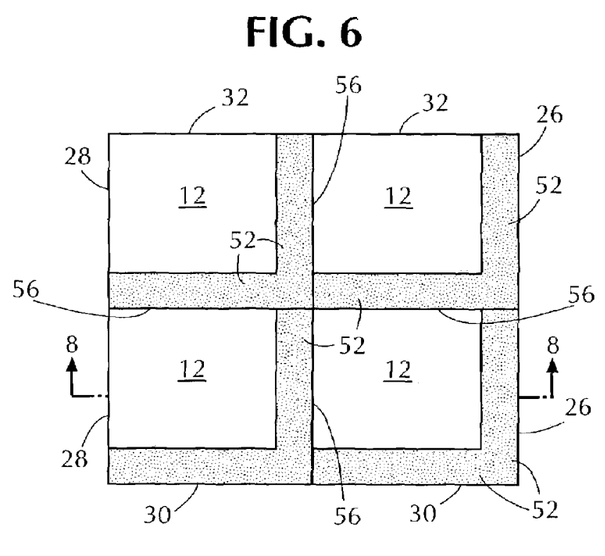
FIG. 6 is a plan view of four tiles of the present invention installed on a floor.
Figure 7:
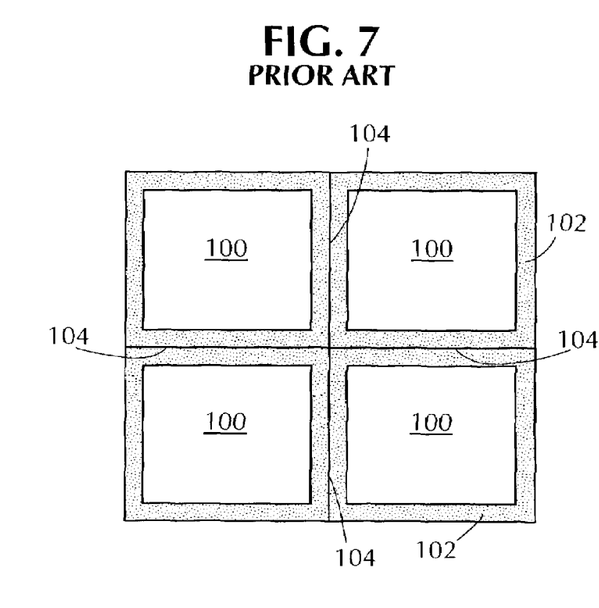
FIG. 7 is a plan view of four prior art resilient tiles installed on a floor.

The advantages of the resilient tile of the present invention become readily apparent upon installation of the tiles on either a floor or wall. Referring to FIG. 6, there are depicted four tiles 12 of the present invention installed on a floor. From this figure it is apparent that the seams 56 between each of the tiles 12 do not reside within any of the mechanically embossed grout lines 52 but rather the seams 56 are adjacent to the grout lines. This makes seams 56 less visible than the seams between prior art floor tiles (see FIG. 7) and the appearance of the floor is more aesthetically pleasing. Prior art floor tiles 100 have grout lines 102 on all four edges of the tile. Therefore, when installed on a floor such as in FIG. 7, the seams 104 between each of floor tiles 100 appear within the grout lines, creating a less desirable appearance.

Figure 9:
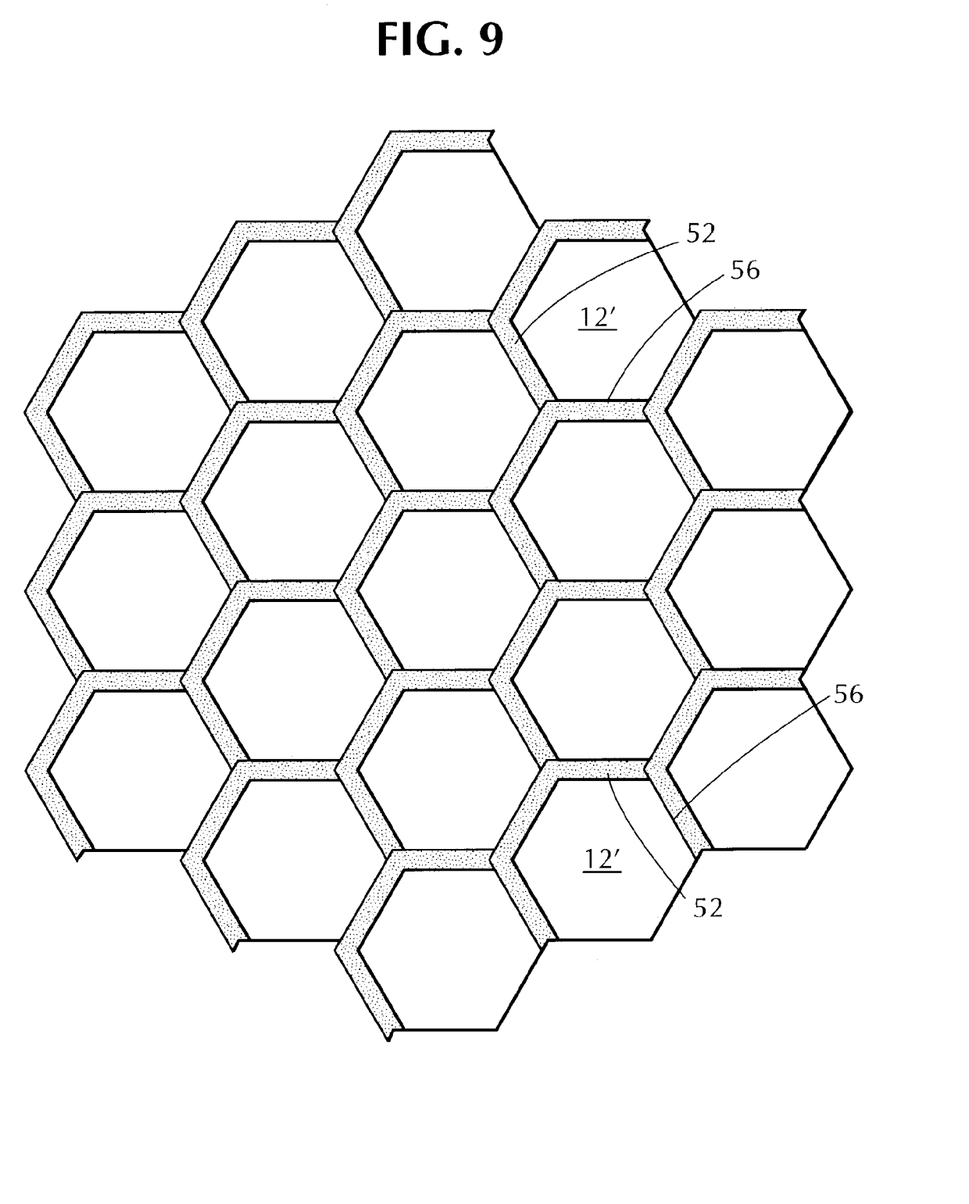
FIG. 9 is a plan view of the resilient tiles of the present invention having six edges installed on a floor.
Figure 10:
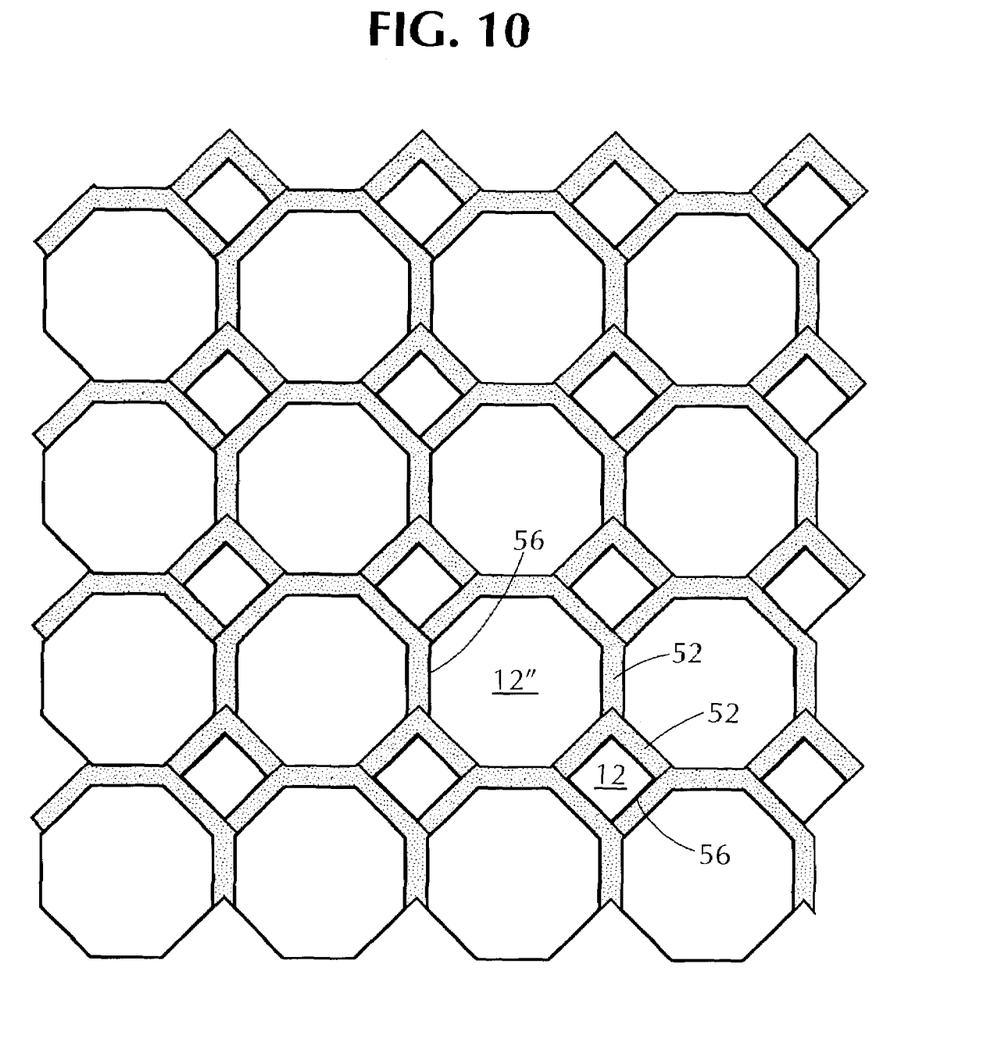
FIG. 10 is a plan view of the resilient tiles of the present invention having four edges and eight edges installed on a floor.
Figure 11A:
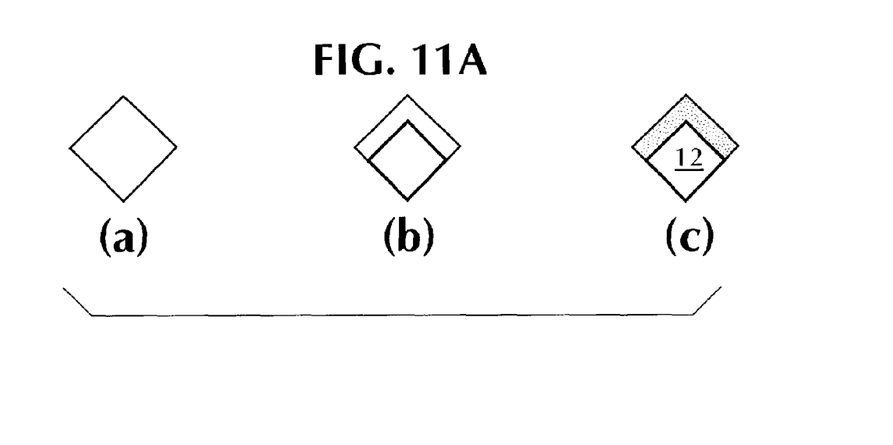
FIG. 11 is a plan view of 4-sided, 6-sided and 8-sided resilient tile of the present invention after the tile is finish cut (a), after the adjacent edges of the tile are routed (b), and after mechanical embossing and inking of the embossed portion of the tile (c).
Figure 11B:
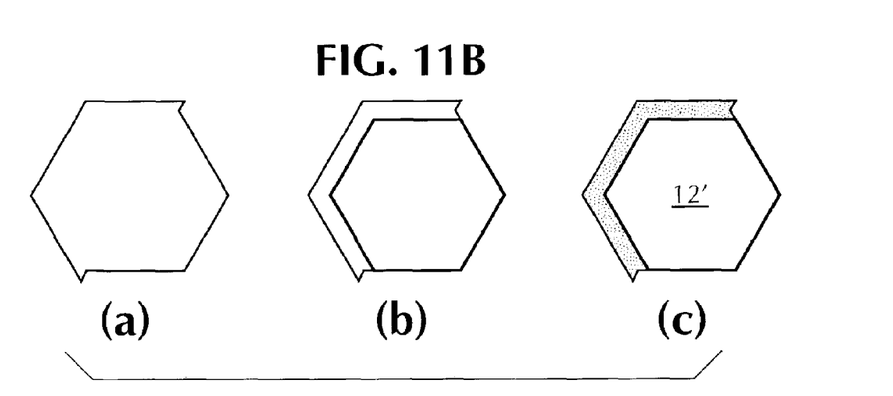
Figure 11C:
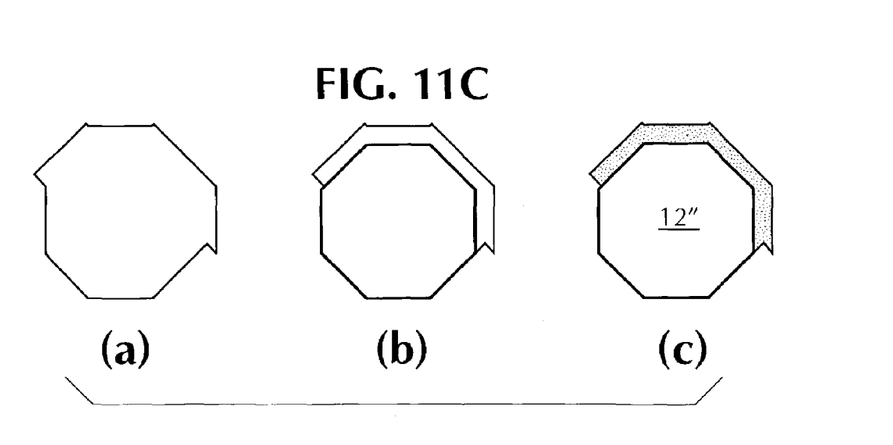
Figure 12:
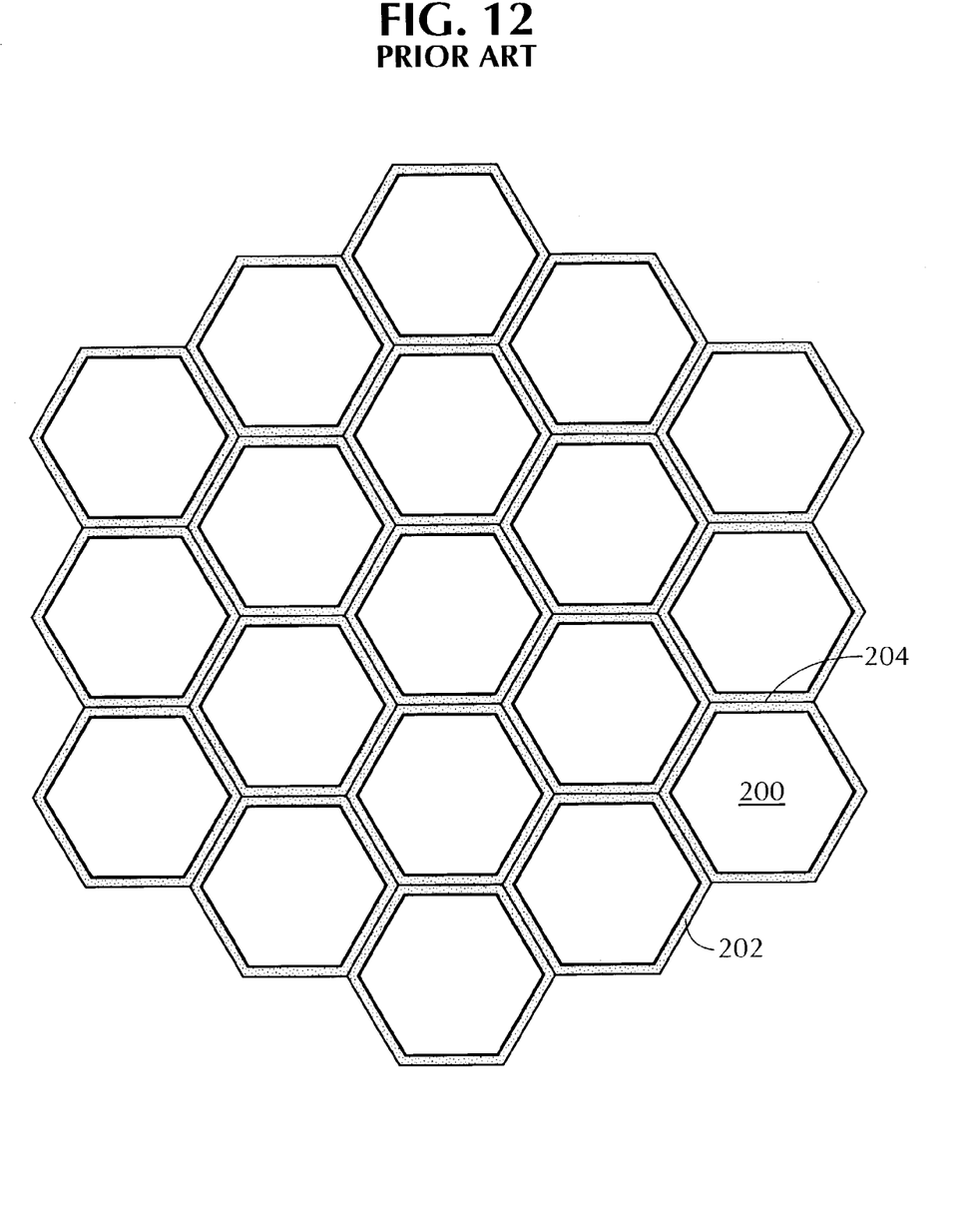
FIG. 12 is a plan view of 6-sided prior art resilient tiles installed on a floor.

The advantages of the resilient tile of the present invention can further be observed upon viewing FIGS. 9 and 10 which also depict tiles of the present invention installed on a floor. Again it is apparent that the seams 56 between each of the tiles 12, 12', 12" of the present invention do not reside within any of the mechanically embossed grout lines 52 but rather the seams 56 are adjacent to the grout lines. This makes seams 56 less visible than the seams between prior art floor tiles. (See FIG. 12). There, prior art floor tiles 200 have grout lines 202 on all six edges of the tile. When installed on a floor, the seams 204 between each of floor tiles 200 appear within the grout lines, creating a less desirable appearance.

Figure 8:
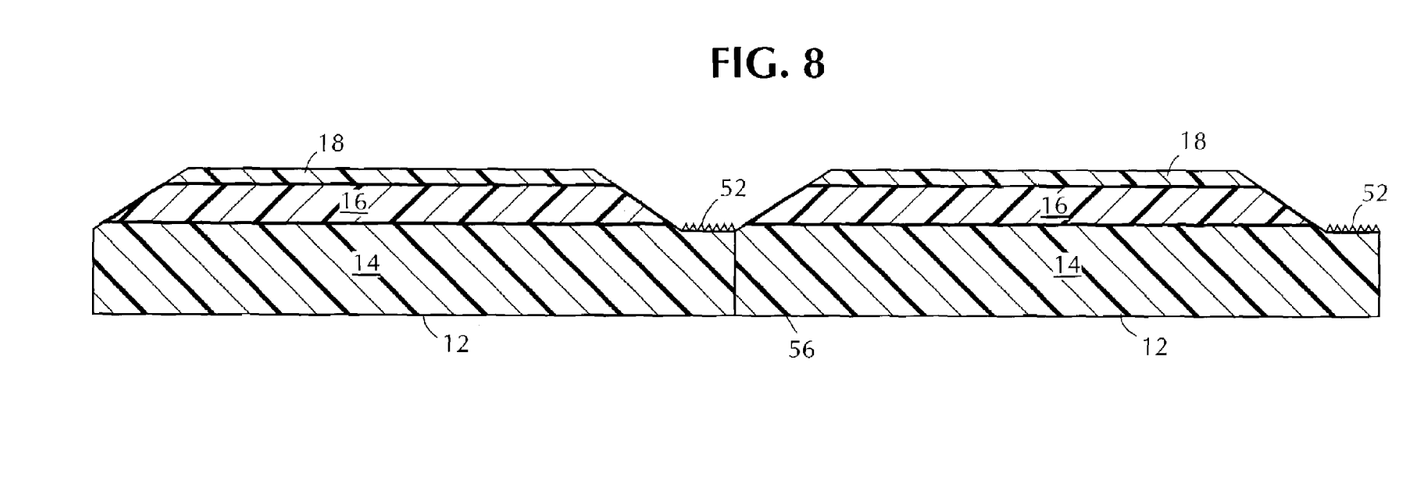
FIG. 8 is a cross-sectional schematic view along line 8-8 of FIG. 6, depicting two resilient tiles of the present invention installed next to each other.

Referring to FIG. 8, there appears a cross-sectional view of two tiles of the present invention installed on a floor adjacent to each other. From this figure it will be observed that the seam 56 between adjacent floor tiles 12 is not within mechanically embossed grout line 52 but rather adjacent to it.

Thus, it is seen that an improved resilient tile and method of making have been provided which readily avoid the problems and shortcomings associated with prior vinyl tiles. The preferred embodiment has been illustrated and described. Further modifications and improvements may be made thereto as may occur to those skilled in the art and all such changes as fall within the true spirit and scope of this invention are to be included within the scope of the claims to follow.

What is claimed is:

1. A surface covering, comprising:
    a resilient tile having an even number of edges wherein one-half of said even number of edges have been routed, mechanically embossed to impart a texture thereon, and covered with a coating or an ink, and the other one-half of said even number of edges have not been routed;

wherein each of said routed edges is adjacent to at least one other routed edge.

2. The surface covering of claim 1, wherein said other one-half of said even number of edges which have not been routed are beveled.

3. The surface covering of claim 2, wherein said texture has the appearance of grout.

4. The surface covering of claim 3, wherein said coating is urethane.

5. The surface covering of claim 1, wherein said resilient tile is a vinyl tile.

6. The surface covering of claim 5, wherein said vinyl tile comprises:
   a substrate; and
   a printed film layer or an inlaid layer on top of said substrate.

7. The surface covering of claim 6, further comprising:
   a top coat layer applied on top of said printed film layer or said inlaid layer.

8. The surface covering of claim 6 or claim 7, wherein said embossing of said routed edges occurs in said substrate.

9. The surface covering of claim 7, wherein said top coat layer is urethane.

10. The surface covering of claim 6, wherein said printed film layer is comprised of:
    a base color layer on top of said substrate;
    a print layer on top of said base color layer; and
    a clear film layer on top of said print layer.

11. A resilient tile having an even number of edges and comprised of a resilient composite substrate having a first upper surface, a printed film layer or an inlaid layer having a second upper surface, said printed film layer or inlaid layer overlaying and adhered to said first upper surface, and an optional top coat layer overlaying and adhered to said second upper surface, one half of the even number of edges having a reduced thickness and a third upper surface thereon, said third upper surface being approximately parallel to said first and second upper surfaces and having a mechanically embossed texture, said one half of the even number of edges being adjacent to one another, the other half of the even number of edges optionally being beveled edges.

12. The resilient tile of claim 11, wherein the mechanically embossed texture imitates the appearance of grout.

13. The resilient tile of claim 11, wherein said one half of the even number of edges having a reduced thickness do not have a printed film layer or a top coat layer.

14. The resilient tile of claim 11, wherein said one half of the even number of edges having a reduced thickness consists essentially of the resilient composite substrate.

15. The resilient tile of claim 11, wherein said resilient tile is a vinyl tile.

* * * * *